May 5, 1970
LENS CARRIAGE FOR CONTINUOUSLY VARIABLE MAGNIFICATION STEREOMICROSCOPE
Filed Nov. 13, 1967
3,510,202
3 Sheets-Sheet 1
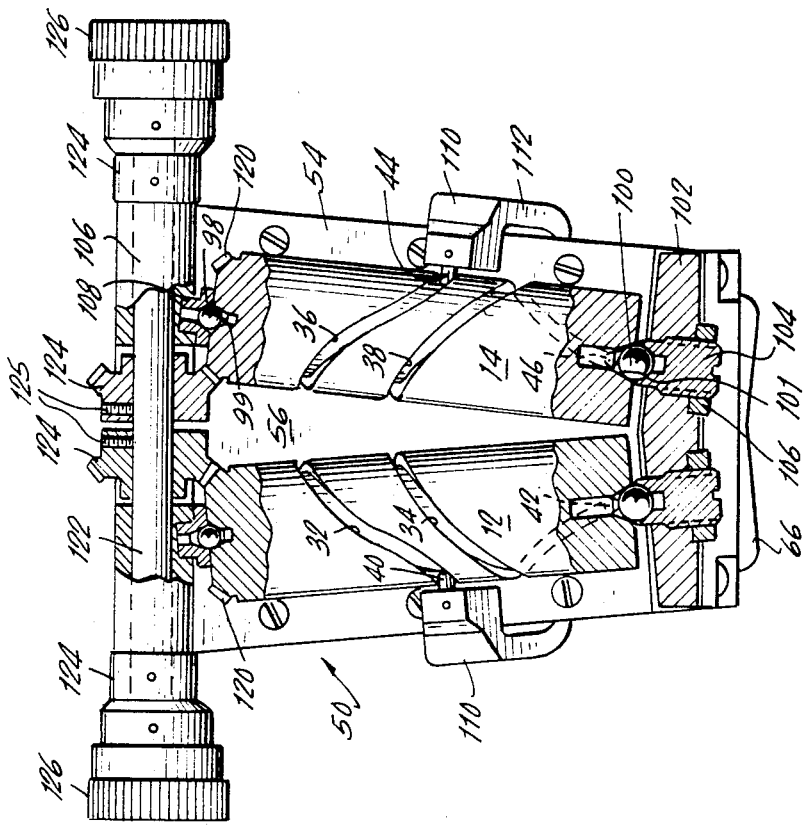
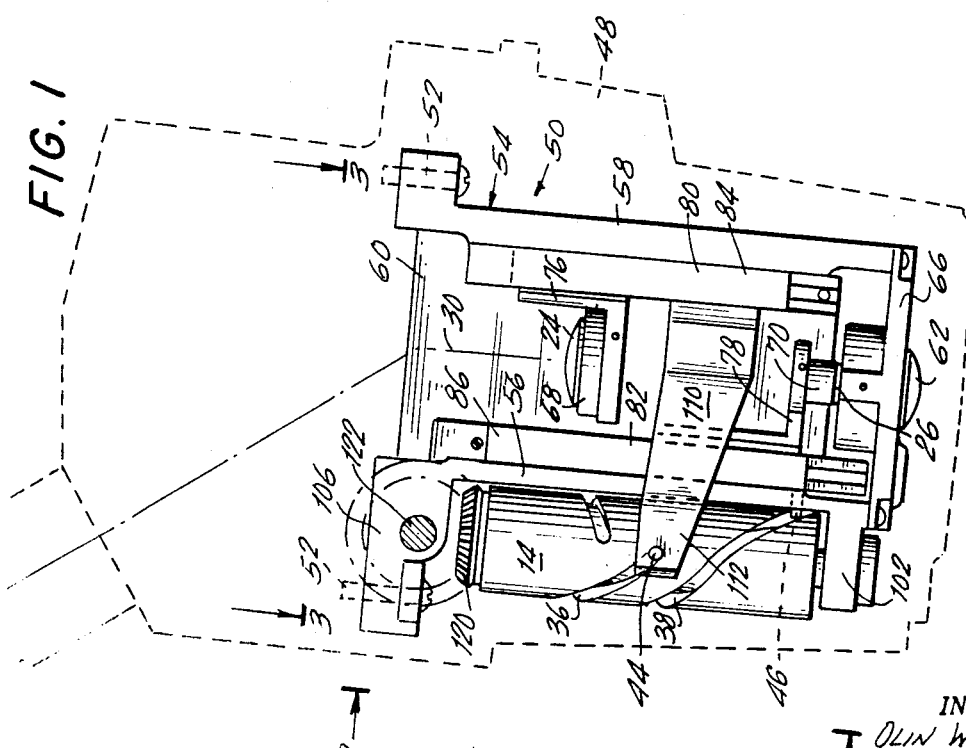
INVENTOR.
OLIN W. BOUGHTON
BY
Amster Rothstein
ATTORNEYS

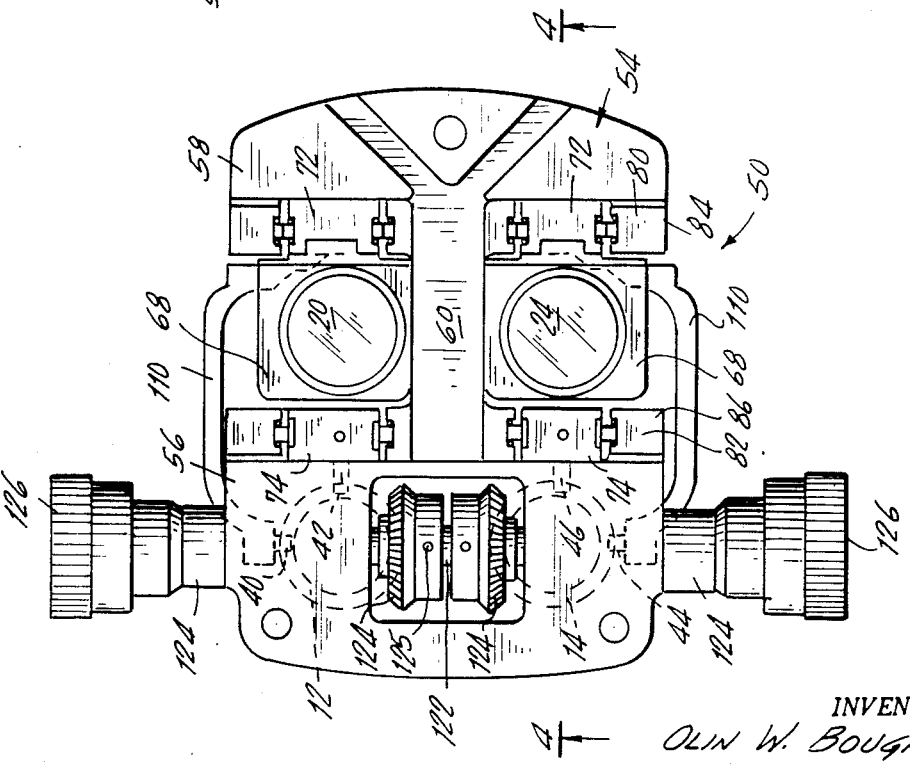

United States Patent Office 3,510,202
Patented May 5, 1970

3,510,202
LENS CARRIAGE FOR CONTINUOUSLY VARIABLE MAGNIFICATION STEREOMICROSCOPE
Olin W. Boughton, Williamsville, N.Y., assignor to American Optical Corporation, Southbridge, Mass., a corporation of Delaware
Filed Nov. 13, 1967, Ser. No. 681,968
Int. Cl. G02b 15/00
U.S. Cl. 350—187                              4 Claims

ABSTRACT OF THE DISCLOSURE

A lens carriage for mounting the lenses of the objective section of a continuously variable magnification stereomicroscope. The objective section has an optical system comprising two identical optical sub-systems. The optical axes of the sub-systems are inclined to each other at an acute angle and a single stationary lens element and two movable lens elements are arranged along each axis. Each of the movable lens elements is held by a lens holder and each holder is fixed to a slide which is mounted for reciprocating movement in a guideway. The displacement of the movable lens elements is controlled by two cam cylinders, each having two camming grooves formed on its periphery. The slide of each lens holder has a follower which rides in one of the camming grooves in the associated one of the cam cylinders. A bevel gear assembly links the cam cylinders to a horizontal control shaft on which a control knob is mounted.

---

This invention relates to a lens carriage for a continuously variable magnification stereomicroscope and more particularly toa lens carriage for the stationary and movable lens elements of the objective section of a stereomicroscope.

Lens carriages for the optical systems of the objective sections of variable magnification stereomicroscopes are known and a typical carriage is disclosed in Boughton, Pat. No. 2,942,519, issued June 28, 1960. The prior art lens carriages, though they have enjoyed considerable commercial use, suffer from a number of deficiencies.

The prior art lens carriages have a control knob which controls the magnification of the microscope and this control knob is mounted for rotation about a vertical axis. This arrangement has been found to be found to be quite cumbersome in actual use because the control knob was necessarily in close physical proximity to the remainder of the instrument and because operators were not familiar with control knobs which rotated about vertical axes.

It is a primary object of this invention to provide a lens carriage for the objective section of a continuously variable magnification stereomicroscope wherein the control knob for adjusting the magnification is mounted for rotation about a horizontal axis and is conveniently located for the instrument operator.

The prior art lens carriages were further characterized by having a pair of inclined cylinders with camming grooves cut on their peripheries and a pair of lens sleeves sliding up and down each cylinder. Each sleeve was fixed to a cam follower which rode in one of the grooves in the cylinder so that as the cylinder rotated, the sleeve would slide axially along its cylinder. Each such sleeve carried a lens element.

The second shortcoming of the prior art lens carriages relates to these lens sleeves which move up and down on the cam cylinders. Because the sleeves were arranged to slide axially along the cylinders and the cylinders were arranged to rotate within the sleeves, sufficient clearance had to be provided to allow the aforesaid relative movements between the cylinders and the sleeve. Such clearance often resulted in excessive play so that the lens sleeves were loosely connected to the carriage. For this reason, the lenses would often vibrate if the instrument were moved and the positioning of the lenses by the cam cylinders was not sufficiently accurate.

It is another object of this invention to provide a lens carriage of the character described having a more rigid lens mounting structure than that found in the prior art, the structure firmly and accurately positioning each of the lenses in any desired position along their path of axial movement as prescribed by the cam cylinders while not interfering with such lens movement.

After a considerable amount of use of the prior art stereomicroscopes, the sliding of the sleeves axially along the cylinders and the rotation of the cylinders within the sleeves causes excessive cylinder wear and the vibration or wobbling of the lenses becomes aggravated, deteriorating the optical performance.

It is another object of this invention to provide a lens carriage of the character described wherein the cam cylinders receive essentially no wear from the axial movement of the movable lens elements.

The use of a pair of sleeves sliding on each cam cylinder also physically limits the minimum distance between the two movable lens elements along each optical axis. The extent to which the two movable lens elements can be brought together is determined by the axial length of each sleeve. Because the minimum distance between the two movable lens elements is thus determined by the sleeve dimensions, the overall length of the objective section of the prior art microscope has been greater than need be from a theoretical consideration of the stereomicroscope's optical reqiurements.

It is another object of this invention to provide a lens carriage of the character described wherein the limit of movement of the lens elements toward one another along an optical axis is not curtailed by the structure of the carriage.

In accordance with the principles of my invention, I provide a new and improved lens carriage for a continuously variable magnification stereomicroscope and, more particularly, for the objective section of such a stereomicroscope. Said carriage includes two identical optical sub-systems with their optical axes inclined to one another. A single stationary lens element and two movable lens elements are positioned along each optical axis. The displacements of the elements along each axis are functions of the angular position of a cam cylinder. The two cam cylinders are also inclined to one another, and each is provided with two camming grooves on its periphery. Each groove on each cylinder is associated with one of the two movable lens elements along its associated optical axis.

The two movable lens elements along each optical axis are retained by respective lens holders. Each of the lens holders is secured to a rigid slide which is mounted for axial reciprocal movement in a guideway in the carriage frame. A separate slide and guideway is used for each of the lens holders and the objective section of the microscope thus includes four slide-guideway sets.

Each lens holder is linked to a cam follower which rides in a camming groove on the periphery of its associated cylinder. Because there is no requirement for sleeves on the cylinders to mount the lens holders within the objective section, there is no resulting wear on the cylinders and the cylinders remain in their initial condition to properly locate the lens elements. No wobbling of the lenses can arise due to wear on the cylinders with extended use of the microscope.

The two cam followers of the present lens carriage associated with each cylinder do not lie along the same tangential plane of their cylinder. Each cam follower makes contact with a respective one of the two grooves on the same cylinder approximately 90 degrees (with respect to the cylinder circumference) away from the other cam follower. This 90-degree offset remains constant as the two cam followers move axially along their cylinder. Consequently, the two followers do not interfere with each other and the minimum distance between the two movable lens elements on each optical axis is determined by the optics of the system, and not by the carriage structure. The overall length of the objective section of the microscope can thus be reduced beyond that heretofore possible.

Moreover, with the aforesaid 90° offset, the camming grooves are displaced from one another further than in previous systems and thus both grooves can be machined simultaneously during the manufacturing process. This was not possible in previous structures, due to the proximity of the grooves.

The cam cylinders are each provided with a bevel gear at the upper end thereof. A horizontal drive shaft for carriage has two bevel gears fixed thereon and a control knob secured at either end. Each of the bevel gears on the drive shaft meshes with one of the bevel gears on the cylinders. By this arrangement, the control knob shaft has its axis in a horizontal plane and the control knobs rotate about a horizontal axis. This position of the control knobs facilitates ease of adjustment of the system magnification by the operator and these control knobs rotate in a manner conventional in the instrument field.

Further objects, features and advantages of the invention will become apparent upon consideration of the following detailed description in conjunction with the drawing, in which:

FIG. 1 is a side elevational view of a lens carriage for a continuously variable magnification stereomicroscope constructed in accordance with the principles of the present invention;

FIG. 2 is a front view of the lens carriage partially in elevation and partially in section;

FIG. 3 is a top plan view of the lens carriage;

Figure 5:
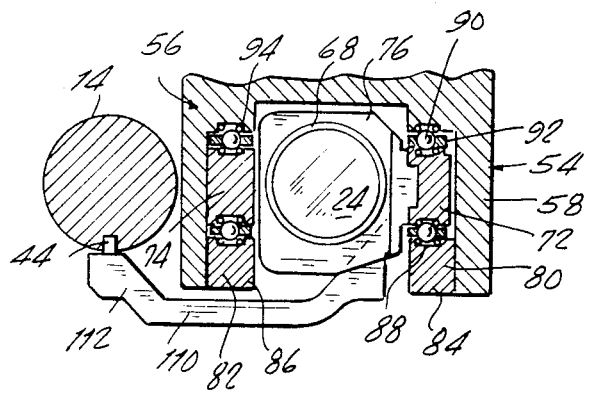
Figure 6:
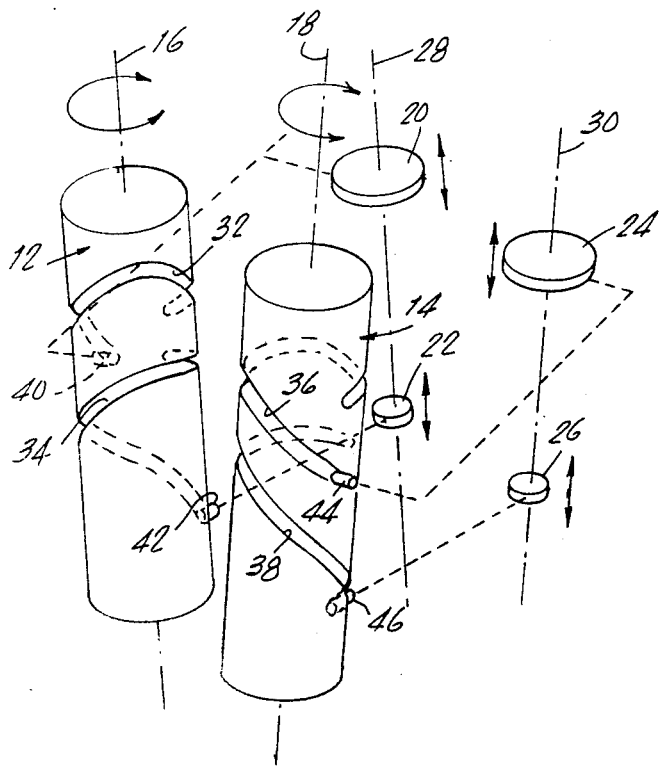

FIGS. 4 and 5 are cross sectional views of the lens carriage taken substantially along line 4—4 of FIG. 3 and line 5—5 of FIG. 4, respectively; and FIG. 6 is a schematic view of the cylinder-camming arrangement used for controlling movement of the four movable lens elements of the optical system.

Referring now in detail to the drawings, and initially to FIG. 6, said figure illustrates schematically that the lens carriage of the present invention includes a pair of camming cylinders 12, 14 which rotate about axes, respectively, 16, 18 which are inclined to one another and which converge toward a point below the cylinders. Each camming cylinder has a pair of movable lens elements associated with it, the camming cylinder 12 having the lens elements 20, 22 associated with it and the camming cylinder 14 having the lens elements 24, 26 associated with it. The lens elements 20, 22 move along an optical axis 28 and the lens elements 24, 26 move along an optical axis 30. The optical axis 28 is parallel to the cylinder axis 16 and the optical axis 30 is parallel to the cylinder axis 18.

The lens elements along each of the optical axes move relative to one another, and for this purpose each of the camming cylinders has a pair of caming grooves formed on its periphery. Specifically, the camming cylinder 12 has a pair of camming grooves 32, 34 formed on its periphery and the camming cylinder 14 has a pair of camming grooves 36, 38 formed on its periphery. The camming grooves 32, 34 are mirror-image opposites of the camming grooves 36, 38 respectively. The curvatures of the grooves determine the directions and rates of movement of the movable lenses.

Each of the lens elements has its movement controlled by the rotation of its associated camming cylinder. For this purpose, the lens elements 20, 22 are linked to cam followers 40, 42, respectively, with the cam follower 40 riding in the groove 32 and the cam follower 42 riding in the groove 34. In a similar manner, the lens element 24 is linked to a cam follower 44 which rides in the camming groove 36, and the lens element 26 is linked to a cam follower 46 which rides in the camming groove 38. It will be apparent from the foregoing that as the camming cylinders 12, 14 rotate about the axes 16, 18, such movement controls and causes movement of the four cam followers axially of the cylinders and such movement of the cam followers controls movement of the lens elements 20, 22 and 24, 26 along the optical axes 28, 30.

Referring now to FIGS. 1 through 5, there is shown in FIG. 1 a housing 48 for the objective section of a stereomicroscope, the housing being shown in dot-dash lines for purposes of illustration. A lens carriage 50 is secured within the housing as by bolts 52 which pass through walls of the carriage and into the housing. The carriage 50 includes a front wall 56, a rear wall 58, the front wall and rear wall being substantially vertical and parallel, and a substantially vertical center wall 60 running from the front wall to the rear wall.

The optical system of the objective section of the stereomicroscope includes two identical optical sub-systems. Each sub-system includes a fixed lens element 62 and a pair of movable lens elements, lens elements 20, 22 being associated with one optical sub-system and the lens elements 24, 26 being associated with the other optical sub-system. Since each optical sub-system as well as the mechanical structure associated therewith is identical, only one of the optical sub-systems and its mechanical structure will be described in detail and like reference numerals will be utilized for similar components in the sub-systems.

The lens elements 20, 22 and 62 lie along the optical axis 28 while the lens elements 24, 26 and 62 lie along the optical axis 30. Lens elements for optical systems which may be used with the carriage and curves for the camming grooves of the camming cylinders are disclosed and claimed in the copending patent applications of R. Muller, filed simultaneously herewith and assigned to the assignee of the present application. The lens element 62 of each sub-system is held stationary with respect to the carriage 50 and is eccentrically fixed within a lens cell 64 for alignment purposes. The cell 64 is secured to a floor 66 which in turn is fixed to the lower edges of the walls 56, 58 and 60.

Describing only the mountings for the movable lens elements 24, 26, each of the aforesaid elements is shiftable along the optical axis 30 with respect to one another and with respect to the fixed element 62. The movable lens elements are also translatable to a slight extent for alignment purposes. The lens elements 24, 26 move at rates which are dissimilar and which are not constant, however, the movement of the lens element 24 on the optical axis 30 is identical to the movement of lens element 20 on the optical axis 28 and similarly, the movement of the lens element 26 on the optical axis 30 is identical to the movement of the lens element 22 on the optical axis 28.

Each of the lens elements 24, 26 is secured within a lens cell, respectively 68, 70 (see FIG. 4). The movable lens elements 20, 24 and 22, 26 are mounted for sliding reciprocal movements along their respective optical axes. For this purpose, each of these lens elements is carried by a slide, and specifically, the lens element 24 is carried by the slide 72 and the lens element 26 is carried by the slide 74 (see FIGS. 1 and 4). The slide 72 is secured to the lens cell 68 by a lens holder 76 and the slide 74 is secured to the lens cell 70 by a lens holder 78. Each holder is secured to its respective slide by a bolt 71. Each of the slides 72, 74 moves parallel to the optical axis 30, the slide 72 moving adjacent to the rear wall 58 and the slide 74 moving adjacent to the front wall 56.

Each of the slides 72, 74 reciprocates in a guideway attached to a different one of the aforesaid walls. The slide 72 reciprocates in the guideway 80 fixed to the rear wall 58 and the slide 74 reciprocates in the guideway 82 fixed to the front wall 56. The outer wall of the guideway 80 is formed by an elongated block 84 and similarly the outer wall of the guideway 82 is formed by an elongated block 86. The other guideway walls are formed by the center wall 60 (see FIG. 5). The facing surfaces of the blocks and the center wall have elongated vertical grooves formed therein. Each of the slides 72, 74 reciprocates within its guideway 80, 82 on a set of ball bearings as at 88, (see FIG. 5), each ball bearing including a set of balls 90 and a retainer 92. To reduce wear, the balls 90 of each bearing roll between four elongated opposed hardened wire guides 94, two of the wire guides being fixed in the slide and the other two wire guides being fixed in the guideway groove. Stops 96 at the upper and lower ends of each guideway limit movement of the ball retainers.

One of the camming cylinders 12, 14 is associated with each of the optical sub-systems previously mentioned. Since the camming cylinders are mirror-images of one another, only the cylinder 14 will be discussed in detail. The camming cylinder 14 is mounted for rotation about its axis 18 between ball bearings 98, 100. The camming cylinder 14 has a pair of opposed axial cavities 99, 101, respectively, to receive said ball bearings (see FIGS. 2 and 4). A lower ledge 102 fixed to the front wall 56 of the carriage frame 54 carries a cup 104 retained in place by a sleeve 106. The cup 104 supports the ball bearing 100 from below the camming cylinder. An upper ledge 106 fixed to the front wall 56 of the frame 54 also carries a cup 108 which retains the upper ball bearing 98 in place.

As mentioned earlier, the camming cylinder 14 has a pair of camming grooves 36, 38 formed thereon and the camming cylinder 12 has a pair of camming grooves 32, 34 formed thereon, the aforesaid camming grooves being formed on the periphery of their respective cylinders.

A cam follower links each of the slides to a different one of the camming grooves. Specifically, the cam follower 110 links the slide 72 to the camming cylinder 14. The cam follower 110 includes a follower arm 112. The end of the arm distant from the slide 72 carries an inwardly projecting follower pin 44.

In a similar manner, the slide 74 is connected to the camming cylinder 14 by a cam follower 46. In this instance, since the slide 74 is closely adjacent to the camming cylinder 14, since the slide is on the side of the front wall 56 opposed to the side thereof nearest the cylinder, and since the slide is only separated therefrom by the front wall 56, the cam follower 46 comprises only a pin (see FIG. 4). The pin passes through an elongated slot 118 in the front wall 56.

It should be noted that the follower pin 44 and the cam follower 46 contact the camming cylinder 14 approximately 90 degrees apart (see FIG. 4), and that the cam follower arm 110 passes around the outside of the carriage frame and outside of the lens holder 78 and slide 74 of the lens element 26, while the cam follower 46 passes directly from its slide to the camming cylinder. Therefore, the movement of one cam follower is not limited in any manner by the position of the other cam follower. Further, it should be noted that the camming cylinders 12, 14 serve solely to position their respective lens elements by positioning the cam followers 110, 46. Thus there is essentially no wear imparted to the camming cylinders 12, 14 during operation of the objective section of the stereomicroscope.

Drive means is provided to rotate the camming cylinders 12, 14 at the same rate, one clockwise and the other counterclockwise. To this end, each of the camming cylinders at its upper end carries a bevel gear 120, the bevel gears being co-axial with their respective cylinders.

The upper ledge 106 of the carriage frame 54 has a drive shaft 122 journaled therein and the drive shaft has fixed thereto a pair of oppositely and outwardly facing bevel gears 124. Said bevel gears 124 engage the bevel gears 120 on the camming cylinders 12, 14. The bevel gears 124 are fixed to the shaft by set screws 125. It is apparent that by individually adjusting the position of the bevel gears on the shaft 122, by loosening the set screws and retightening the same to fix the bevel gears at different angular locations, the movable lenses of both subsystems, through the camming cylinders and followers, can be positioned to move simultaneously and to like stations along their respective optical axes.

The ends of the drive shaft 122 protrude beyond the ends of the ledge 106 and the drive shaft is retained in place by a pair of sleeves 124. A control knob 126 is fixed to each end of the drive shaft. Due to the aforesaid bevel gear arrangement, the drive shaft 122 as well as the control knobs 126 are mounted for rotation about a horizontal axis. The foregoing position of the control knobs 126 is quite convenient to a user, is sufficiently distant from the remainder of the housing so that it may be reached with ease by a user, and is located in a manner conventional in the instrument field.

The operation of the lens carriage will be apparent from the foregoing structural description. Briefly, the control knobs 126 are rotated in either direction about a horizontal axis by the user. The rotation thereof causes like rotation of the drive shaft 122 which in turn rotates the bevel gears 124. Rotation of the aforesaid bevel gears drives the camming cylinders 12, 14 through like angular extents about their respective inclined axes, but in opposed directions. The cam followers riding in the camming grooves move upwardly or downwardly in accordance with the curves of their respective camming grooves 32, 34 and 36, 38. The cam followers translate the rotative movement of the camming cylinders to linear movement of the slides 72, 74 which in turn move their respective lens elements 24, 26 in a similar manner.

The movements of the movable lens elements with respect to each other and with respect to the fixed lens elements of the optical sub-systems provide a continuous range of magnification of an object being viewed. Such range is of course determined by rotation of the described control knobs. Once the object is placed into focus initially, as by racking the housing upwardly or downwardly in a well known manner, such variable magnification is accomplished without further focusing.

A latitude of modification, change and substitution is intended in the foregoing disclosure and in some instances some features of the invention will be employed without a corresponding one of other features.

What I claim is:

1. A lens carriage for the objective section of a stereomicroscope, the carriage including a frame, a pair of camming cylinders, the cylinders being mounted for rotation about axes inclined to one another, each cylinder having a pair of camming grooves formed on its periphery, an optical system associated with each cylinder, each system including a fixed lens element and a pair of relatively movable lens elements, the lens elements of each system being continuously in alignment along an optical axis parallel to the axis of the associated cylinder, the fixed lens elements being carried by the frame, means slidably mounting each of the movable lens elements for movement along their associated optical axis, said means comprising a slide for carrying each said lens element and a guideway for each slide in which the slide shifts, each slide for each movable lens element shifting in a separate guideway, the slides being distant from the cylinders and the guideways being secured to the frame, a cam follower controlling the movement of each slide independently as a function of the curvature of a different camming groove, each cam follower being fixed to a different slide and extending externally therefrom to its associated cylinder, each cam follower including a follower pin riding in its associated groove, the movable lens elements being in contact with the cylinders only through the pins, and drive means for rotating the cylinders thereby to position the movable lens elements.

2. A lens carriage as set forth in claim 1 wherein each cylinder carries a bevel gear, and the drive means includes a drive shaft, means secured to the frame mounting the drive shaft for rotation about a substantially horizontal axis, the drive shaft carrying a pair of bevel gears, said pair of gears being matingly engaged to the bevel gears on the cylinders, and a control knob fixed to the drive shaft on one end thereof, whereby rotation of the control knob about a horizontal axis rotates the camming cylinders.

3. A lens carriage as set forth in claim 1 wherein the pins of the cam followers associated with each camming cylinder contact said cylinder at locations approximately 90 degrees apart whereby the movement of one cam follower associated with each cylinder is free from interference by the other cam follower associated with the same cylinder.

4. A lens carriage as set forth in claim 3 wherein the frame includes a front wall and a rear wall, the walls being substantially parallel, one of the guideways associated with each camming cylinder being secured to the rear wall and the other guideway associated with said camming cylinder being secured to the front wall, the guideways facing one another, the camming cylinder being mounted for rotation on the side of the front wall opposed to the side on which said other guideway is secured, the slide mounted in said other guideway having its cam follower pin passing directly through said front wall into its associated camming groove, the slide mounted in the said one guideway having a cam follower with an arm passing around the other slide and the lens element associated with the other slide.

References Cited

UNITED STATES PATENTS

| | | | |
|---|---|---|---|
| 3,404,616 | 10/1968 | Zoeber | 350—187 X |
| 2,171,360 | 8/1939 | Strang | 350—44 |
| 2,942,519 | 6/1960 | Boughton et al. | 350—187 |
| 3,030,861 | 4/1962 | Mortimer et al. | 350—187 |
| 3,057,259 | 10/1962 | Schuma | 350—44 |
| 3,060,801 | 10/1962 | Boughton et al. | 350—44 |

PAUL R. GILLIAM, Primary Examiner

U.S. Cl. X.R.

350—44